United States Patent
Odajima et al.

(10) Patent No.: US 7,671,122 B2
(45) Date of Patent: Mar. 2, 2010

(54) WAX COMPOSITION AND METHOD FOR PRODUCTION THEREOF

(75) Inventors: Shingo Odajima, Tochigi (JP);
Nobuyuki Isshiki, Wakayama (JP);
Hidetoshi Oga, Tochigi (JP); Hitoshi Otsuka, Tochigi (JP); Minoru Goto, Tochigi (JP); Akira Kawamata, Wakayama (JP)

(73) Assignee: Kao Corporation, Tokyo (JP)

( * ) Notice: Subject to any disclaimer, the term of this patent is extended or adjusted under 35 U.S.C. 154(b) by 716 days.

(21) Appl. No.: 10/532,506

(22) PCT Filed: Oct. 22, 2003

(86) PCT No.: PCT/JP03/13485

§ 371 (c)(1),
(2), (4) Date: Jan. 12, 2006

(87) PCT Pub. No.: WO2004/037504

PCT Pub. Date: May 6, 2004

(65) Prior Publication Data

US 2006/0233865 A1    Oct. 19, 2006

(30) Foreign Application Priority Data

Oct. 23, 2002  (JP)  ............ 2002-307983
Oct. 6, 2003   (JP)  ............ 2003-346785
Oct. 6, 2003   (JP)  ............ 2003-346888
Oct. 9, 2003   (JP)  ............ 2003-351263

(51) Int. Cl.
*C08L 91/06* (2006.01)
*C10G 73/40* (2006.01)

(52) U.S. Cl. ............ 524/277; 524/488; 524/543
(58) Field of Classification Search ............ 524/275, 524/277, 488, 543
See application file for complete search history.

(56) References Cited

U.S. PATENT DOCUMENTS

| | | | | |
|---|---|---|---|---|
| 2,159,152 A | * | 5/1939 | Hershberger | 427/358 |
| 2,299,951 A | * | 10/1942 | Ingle | 523/100 |
| 2,375,162 A | * | 5/1945 | Zemaitis | 524/575.5 |
| 2,413,239 A | * | 12/1946 | Manson | 426/6 |
| 2,595,911 A | * | 5/1952 | Young et al. | 524/487 |
| 2,906,640 A | * | 9/1959 | Bartlett | 427/236 |
| 4,919,841 A | * | 4/1990 | Kamel et al. | 252/186.26 |
| 2001/0023013 A1 | * | 9/2001 | Yamamoto et al. | 428/195 |

(Continued)

FOREIGN PATENT DOCUMENTS

JP         50-7802         1/1975

(Continued)

OTHER PUBLICATIONS

Machine Translation of JP 07-278510 (undated).*

(Continued)

*Primary Examiner*—Marc S Zimmer
*Assistant Examiner*—John Uselding
(74) *Attorney, Agent, or Firm*—Oblon, Spivak, McClelland, Maier & Neustadt, L.L.P.

(57) ABSTRACT

A process of producing a wax composition mainly comprising a wax, including the step of mixing the wax and a component to be mixed with the wax by applying an external force at a temperature lower than the melting completion temperature of the wax.

4 Claims, 4 Drawing Sheets

U.S. PATENT DOCUMENTS

2001/0056039 A1 * 12/2001 Yoshinari et al. ............ 503/227

FOREIGN PATENT DOCUMENTS

| | | |
|---|---|---|
| JP | 54-20009 | 2/1979 |
| JP | 57-32447 | 2/1982 |
| JP | 58-13699 | 1/1983 |
| JP | 59-66598 | 4/1984 |
| JP | 63-305368 | 12/1988 |
| JP | 1-217087 | 8/1989 |
| JP | 5-339557 | 12/1993 |
| JP | 7-278510 | 10/1995 |
| JP | 08-209000 | 8/1996 |
| JP | 9-316252 | 12/1997 |
| JP | 11-352720 | 12/1999 |
| JP | 2001-288295 | 10/2001 |
| JP | 2002-72559 | 3/2002 |
| JP | 2002-179926 | 6/2002 |
| JP | 2002-266284 | 9/2002 |
| JP | 2003-5431 | 1/2003 |
| JP | 2003-183408 | 7/2003 |
| JP | 2003-250450 | 9/2003 |
| JP | 2003-261820 | 9/2003 |

OTHER PUBLICATIONS

C.C. Ho et al. Low Glass Transition Temperature Rubber Latex Film Formation Studied by Atomic Force Microscopy. Langmuir 2000, 16, 2436-2249.*

Rubber Formulary Ciullo, P.A.; Hewitt, N. 1999 William Andrew Publishing p. 1-72.*

* cited by examiner

WAX COMPOSITION AND METHOD FOR PRODUCTION THEREOF

TECHNICAL FIELD

The present invention relates to a composition mainly comprising a wax and a process of producing the same.

The present invention also relates to a biodegradable wax composition excellent in moistureproofness and easy to process into a multilayer film or a coating layer.

The present invention also relates to a biodegradable wax composition excellent in moistureproofness and easy to process by, for example, melt molding.

BACKGROUND ART

Compositions mainly comprising a wax, such as moistureproof coatings, have been prepared mostly by mechanically mixing constituent components in their molten state (see JP-A-7-278510) or mixing a wax emulsion with other components (see JP-A-59-66598). A coating technique includes a method comprising applying a solution of a wax composition in a solvent, followed by drying to form a coating film of the wax composition (see JP-A-2002-266284). However, these techniques of the related art involve the following problems.

When a solid or high-viscous substance is mixed into a wax by mechanically mixing in a molten state, it has been difficult to uniformly disperse the components because the viscosity of the molten wax is so low that sufficient shear force is not exerted on the components to be mixed up.

In using a wax emulsion, it is impossible to disperse a component whose particle size is equal to or smaller than that of the component constituting the emulsion, which has made it difficult to obtain a uniform disperse system.

The method using a solvent involves the smell and safety problem caused by a residual solvent in an intermediate or final product. To use a large quantity of a solvent also gives adverse influences on the natural environment and the working environment. In recent years the residual solvents in lamination adhesives, printing inks, etc. used in food packaging materials have been of concern for influences on human bodies. Improvements have been awaited therefore. To address these problems, it would be a fundamental solution to establish a method using no solvent in the production steps.

Waxes having high melting points are hard to dissolve in a solvent and therefore difficult to formulate into a uniform composition. When a component to be mixed is a solvent-insoluble substance (e.g., inorganic particles), it is difficult to thoroughly disperse due to insufficient force applied to the component. Where there is a difference in specific gravity between a wax and a component being mixed, the component would settle down, resulting in uneven concentration.

The present invention has been completed in the light of the above-described problems. A first object of the present invention is to provide a wax composition mainly comprising a wax, free from residual solvent, and having a constituent component dispersed uniformly and to a process of producing such a wax composition at low cost.

A wax is widely used as a component of moistureproof agents or hot-melt adhesives. The recent increasing awareness of environmental issues has boosted the demand for wax-containing materials to have biodegradability. There are various biodegradable waxes. Having extremely low melt viscosities, waxes are usually used as mixed with resins and the like.

For example, a biodegradable hot-melt adhesive composition mainly comprising a thermoplastic resin and a tackifier is known (see JP-A-5-339557). In the composition disclosed, at least one of the thermoplastic resin and the tackifier is polylactic acid or a lactic acid copolymer, and the composition contains 50% by weight or less of a wax. A biodegradable hot-melt adhesive composition comprising raw rosin, natural rubber, and a wax is also known (see JP-A-7-278510). These compositions do not have sufficient moistureproofness. Therefore, a film prepared by melt molding the composition is unfit for use as a liner of packaging materials and containers required to have moistureproofness. While the compositions have an increased melt viscosity over that of the wax used therein in view of nature of the use as a hot-melt adhesive, their melt viscosities are not so high as to enable melt molding to produce T-die film or blown film by use of an extruder.

Among melt moldable, biodegradable compositions is the one disclosed in JP-A-2001-288295, which contains corn gluten meal and natural rubber as main components and is to exhibit high water resistance and high wet strength. The composition is, however, insufficient in moistureproof performance similarly to the hot-melt adhesive compositions disclosed in JP-A-5-339557 and JP-A-7-278510 supra.

A coating composition prepared by mixing natural rubber and carnauba wax or candelilla wax with the aid of a solvent is also known (see JP-A-2002-266284). The coating composition is used to provide a paper-made container with a moistureproof coat. Containing a large amount of a solvent, the composition has too low a viscosity to be molded by means of an extruder.

Thus, there has been no composition available that is melt moldable, sufficiently highly moistureproof, and biodegradable, nor a composition that is highly adhesive, sufficiently highly moistureproof, and biodegradable.

Accordingly, a second object of the present invention is to provide a biodegradable wax composition that can eliminate various disadvantages associated with the aforementioned known biodegradable wax compositions.

Moistureproof packaging materials or containers are manufactured by applying a wax composition containing a low molecular wax to a substrate, such as paper or a resin film, or co-extruding the wax composition together with a thermoplastic resin to obtain a multilayered laminate.

These processing steps are often carried out at or above the melting point of the low molecular wax. The problem is that the composition has poor processability because of the low viscosity of the low molecular wax. Although the viscosity of a wax composition during processing could be increased by adding a large amount of a polymer, such results in reduction of the moistureproof performance.

When products manufactured by using a wax composition, such as moistureproof containers, are handled at a high temperature for, for example, packing, sterilizing or cooking the contents, the wax layer can delaminate from the adjacent layer, or the wax layer can flow to lose its thickness uniformity, which results in reduction of the moistureproof performance.

JP-A-8-209000 describes a wax composition for providing a paper container with water resistance and the like which contains a petroleum wax having a melting point of 45° to 85° C. as a main component. This composition is difficult to melt mold by T-die extrusion or blown-film extrusion on account of its low melt viscosity. Moreover, the resulting coated paper container does not maintain the water resistance when heat treated at high temperature.

JP-A-2003-5431 discloses a toner for electrophotography which contains two waxes different in melting point. The wax to resin ratio being extremely low, the toner is not applicable to formation of a moistureproof layer.

DISCLOSURE OF THE INVENTION

The present inventors have found that the first object of the invention is accomplished by mixing a wax and a component to be mixed with the wax at a temperature lower than the melting completion temperature of the wax.

Based on the above finding, the present invention provides a process of producing a wax composition mainly comprising a wax. The process includes the step of mixing the wax and a component to be mixed with the wax by applying an external force thereto at a temperature lower than the melting completion temperature of the wax.

The present invention also provides a biodegradable wax composition which mainly comprises a wax and contains a biodegradable amorphous polymer and is produced by the above-described process of producing a wax composition.

The present invention also provides a biodegradable wax composition which mainly comprises a wax, contains a biodegradable polymer, and has a residual solvent concentration of 3 ppm or lower.

The second object of the present invention is accomplished by a biodegradable wax composition mainly comprising a wax and having a moisture permeability of 3 g·mm/m²·24 hr or less at 40° C. and 90% RH and a melt flow rate of 0.1 to 1000 g/10 min at 125° C. and 1.2 kgf.

The present invention also provides a biodegradable film having a moistureproof layer containing the biodegradable wax composition of the present invention and a biodegradable resin layer provided on at least one side of the moistureproof layer.

The present invention also provides a biodegradable laminate having a paper substrate, the biodegradable wax composition provided on the paper substrate, and a biodegradable resin layer provided on the biodegradable wax composition.

The present invention also provides a biodegradable container having a biodegradable container body and the above-described biodegradable film. The biodegradable film covers the whole or a part of the surface of the container body with the biodegradable resin layer facing the direction opposite to the container body.

The present invention also provides a wax composition containing a high-melting wax component having an endothermic peak at 100° C. or higher in differential scanning calorimetry (DSC), a low-melting wax component having an endothermic peak at 40° C. or higher and lower than 100° C. in DSC, and a polymer. The composition contains the two wax components as main components.

The present invention also provides a moistureproof film having a moistureproof layer containing the above-described wax composition of the present invention and a resin layer provided on at least one side of the moistureproof layer.

The present invention also provides a process of producing a moistureproof article having a moistureproof layer containing a wax composition by using the above-described wax composition of the present invention. The process includes the step of subjecting the wax composition to processing involving heating at a heating temperature of at least 100° C. The heating temperature is such that the ratio of the endothermic value in the region higher than the heating temperature to the endothermic value in the region lower than the heating temperature in a DSC curve of a mixture of the wax components is 0.1 to 5.0.

BEST MODE FOR CARRYING OUT THE INVENTION

Figure 1:
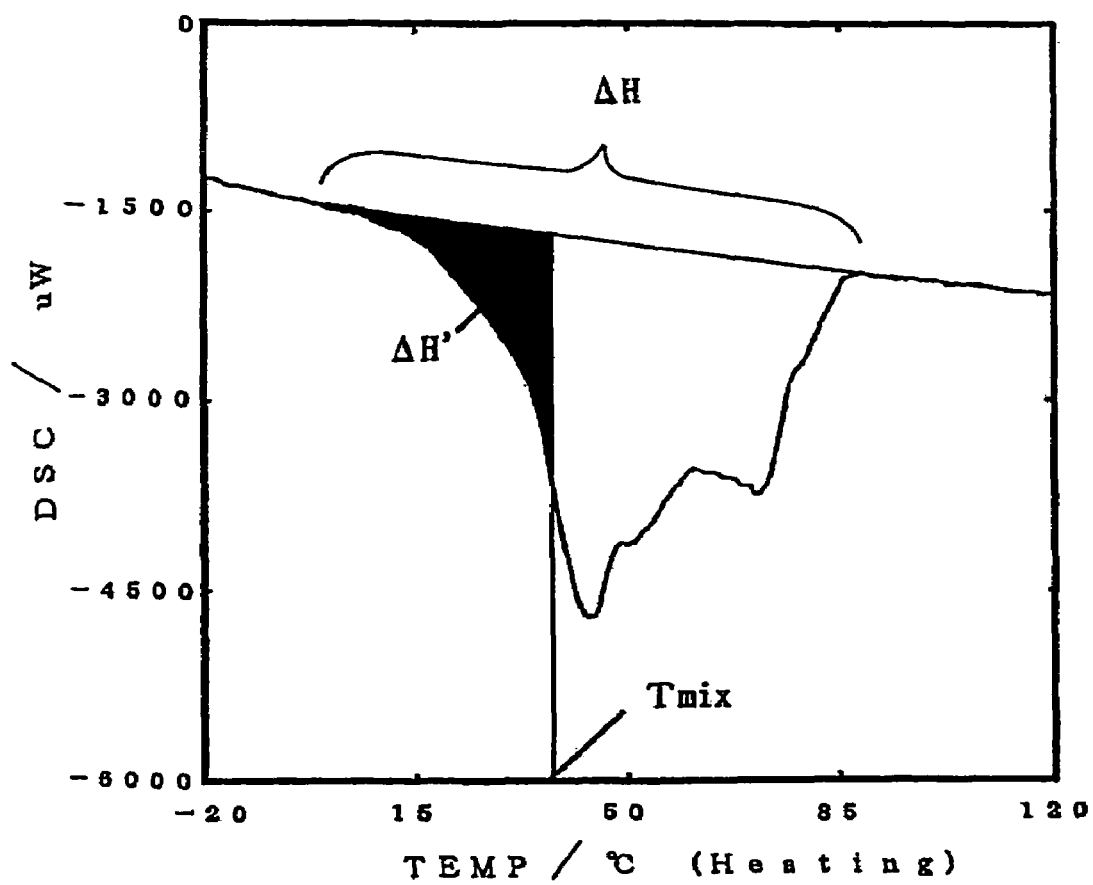
FIG. 1 is a DSC curve showing the relationship between ΔH, ΔH', and mixing temperature.

The present invention will be described with reference to its preferred embodiments.

A wax composition according to a first embodiment of the present invention is described first.

The wax composition of the first embodiment contains a wax as a main component. Components that can be mixed with the wax include polymers, such as thermoplastic resins and elastomers, and organic or inorganic powders. In other words, the process of producing a wax composition according to the present invention is especially advantageous in mixing a wax with a viscous polymer having a higher viscosity than the melt viscosity of the wax or dispersing a solid substance, e.g., powder, in a wax. This is because the hereinafter described process of the present invention makes it possible to exert a high shear force on the component to be mixed via a non-molten, high-viscosity wax.

Where biodegradability is required of the wax composition, it is preferred to use materials whose biodegradability (specified in JIS K6950) is 50% or higher, more preferably 60% or higher, to make up the composition.

The wax composition of the embodiment contains a wax as a main component. High effects are exhibited at a wax proportion of 40 wt % or higher. Higher effects are obtained at a wax proportion of 50 wt % or higher, particularly at a wax proportion of 60 wt % or higher, in which cases the wax forms a matrix phase. Where the component to be mixed with the wax is a high-specific-gravity material, such as inorganic powder, higher effects are assured in a system in which the wax forms a matrix phase, i.e., the volume fraction of the wax is preferably 50% or higher, more preferably 60% or higher.

The wax that can be used includes plant waxes, animal waxes, mineral waxes, petroleum waxes, and synthetic waxes. Examples of usable waxes are described, e.g., in Kenzo Fusegawa, Wax no seishitu-to-ohyo, 2nd Ed., Saiwai Shobo, 1993, 2, Table 1.0.1 (hereinafter referred to as reference 1).

The plant waxes include rice wax, carnauba wax, Japan wax, and candelilla wax. The animal waxes include bees wax, lanolin, and whale wax. The petroleum waxes include microcrystalline wax and paraffin wax. The synthetic waxes include polyethylene wax and Fisher-Tropsch wax. Examples of the mineral waxes are montan wax, ozokerite, and ceresin. Any of these waxes can be used preferably. It is preferred to use a wax having a small low-melting component content so as to exert a sufficient shear force to the component to be mixed while minimizing reduction of its viscosity due to shear heat generation during mixing. For the same reason, it is preferred to use a wax having a small amorphous component content. There are some applications in which a wax composition is required to have some tackness at ambient temperature. In such applications, it is preferred for the wax to contain an appropriate amount of a low-melting component or an amorphous component as long as the mixing operation is not affected. From this viewpoint, a wax having a melting point of 40° C. or higher, preferably 60° C. or higher, as measured in accordance with JIS K2235-5.3.2 is suitable.

The aforementioned polymer can be used for the purpose of modifying the physical properties of the wax in a solid or molten state or imparting a desired function to the wax. For instance, the polymer is used for improving the mechanical strength of the wax in a solid state including breaking strength, impact strength, and bending strength, imparting flexibility, improving adhesion to an adherent, or improving melt viscosity in a molten state. The polymer is preferably added in an amount of 5% to 35%, more preferably 15% to 30%, based on the weight of the wax. With that amount of the polymer, modifying the physical properties of the wax or imparting functions to the wax can be achieved effectively.

The polymer to be used includes crystalline polymers, such as polyolefin resins, polyester resins, and polyamide resins; and non-crystalline (amorphous) or low-crystalline polymers, such as unvulcanized rubber and copolymers based on polyester, polyamide, polystyrene or poly(meth)acrylate. In order to finely disperse the polymer in the wax composition, the crystalline polymer is preferably one melting at a desired mixing temperature, which is equal to or lower than the melting completion temperature of the wax; and the non-crystalline polymer is preferably one whose glass transition temperature is not higher than a desired mixing temperature, which is equal to or lower than the melting completion temperature of the wax.

Specifically, the crystalline polymer includes those having a low melting point, such as ethylene-α-olefin copolymers, ethylene-vinyl acetate copolymers, ethylene-methacrylic acid copolymers, polycaprolactone, polybutylene terephthalate adipate, and polybutylene succinate adipate. The amorphous polymer includes isoprene rubber, natural rubber, and poly-d,l-lactic acid. These crystalline and amorphous polymers can be used either individually or as a combination of selected two or more thereof.

Where biodegradability is required of the wax composition, natural rubber or synthetic isoprene rubber is preferably selected from among the above-recited polymers, which is a biodegradable polymer highly effective on modification of physical properties. Taking smell, color, protein allergy, etc. into consideration, synthetic isoprene rubber is preferred to natural rubber. In mixing a wax with natural rubber or synthetic isoprene rubber, the hereinafter described process of production according to the present invention provides a wax composition having heretofore unobtainable modified physical properties without using a solvent or a like aid. Mixing natural rubber or synthetic isoprene rubber into a wax by the process of the present invention makes it possible to achieve an extremely uniform mixed state of the natural rubber or synthetic isoprene rubber, bringing about effects, such as a drastic increase of the melting viscosity of the wax and a great reduction in brittleness of the wax at temperatures below the melting point of the wax.

The above-described polymers can be used either individually or as a combination of two or more thereof.

The aforementioned organic powder includes corn starch, starch, and various polymer particles. The inorganic powder includes titanium oxide, talc, mica, smectite, and silica.

Containing no solvent, the wax composition of the embodiment is substantially free from a residual solvent. The concentration of any residual solvent is not higher than 3 ppm, a detection limit. Therefore, the wax composition of the present embodiment is of extremely high safety, not polluting the working environment in the site for producing an intermediate or final product using the wax composition. The wax composition of the present embodiment can be utilized with safety in many fields including food packaging materials and other packaging materials.

The wax composition of the present embodiment can appropriately contain antioxidants, colorants, dispersing aids, and other additives where needed as long as the effects of the wax composition or the production steps for producing the wax composition are not influenced.

The process of producing a wax composition according to the present invention will be described with reference to production of the wax composition of the first embodiment as a preferred embodiment of the process.

According to the process of the present invention, the wax composition of the embodiment is produced by mixing the above-described wax and the above-described component to be mixed with the wax at the above-described predetermined ratio by a mechanical force of a kneading machine of various kinds at a temperature lower than the melting completion temperature of the wax, preferably at a temperature not higher than the melting peak temperature obtained from a DSC curve. When the DSC curve has two or more melting peaks, the mixing temperature is preferably a temperature not higher than the peak temperature of the peak having the greatest heat of fusion. If the wax and the component are mixed at or above the melting point of the wax, the wax abruptly reduces in viscosity due to melting and fails to apply sufficient shear force to the component. As a result, mixing would be insufficient, which makes it difficult to provide a uniform composition. As long as the mixing temperature is lower than the wax's melting completion temperature, there remain unmelted crystals of the wax, with which the wax can behave seemingly as a high-viscosity fluid. As a result, mixing of the wax and the component can be effected in a manner commonly practiced in preparing a plastic compound.

A more preferred mixing temperature can be determined as follows. FIG. 1 showing a DSC curve of a wax is referred to. The total endothermic value of the melting wax component is taken as $\Delta H$. Mixing can be carried out satisfactorily in a temperature range in which the integrated endothermic value $\Delta H'$ in the lower temperature side (the endotherm from the melting start temperature up to a mixing temperature Tmix) is preferably 70% or less, more preferably 50% or less, most preferably 30% or less of $\Delta H$. Mixing at lower temperatures than the melting start temperature of the wax is not problematic. Nevertheless, when it is desirable for a wax, particularly, a highly crystalline, hard wax to have viscousness, the lower limit of the mixing temperature is preferably set so that the integrated value $\Delta H'$ may be at least 3%, more preferably 5% or more, of the $\Delta H$.

The optimal mixing temperature is appropriately chosen from the above-mentioned temperature range in accordance with the physical properties of the component to be mixed with. For example, an amorphous polymer is preferably mixed at or above its glass transition temperature; and a crystalline polymer is preferably mixed at or above its melting point. Organic or inorganic powder is preferably mixed at a temperature sufficiently lower than the wax's melting completion temperature (e.g., a temperature lower than the wax's melting start temperature) so that uniform dispersion of the powder may be achieved more easily. If the wax is too hard, the disperse condition may deteriorate, or an excessive load may be imposed on mixing equipment. To avoid this, mixing is preferably conducted at or above the glass transition temperature of the wax. It is preferred that the mixing temperature be adjusted within the above-recited preferred range so that both the wax and the component to be mixed therewith may be in their most suitable physical conditions for mixing, with due considerations given to the temperature dependence of the physical properties of the wax and the component.

The melting completion temperature, the melting peak temperature, and the ΔH' to ΔH ratio of the wax used in the present embodiment are determined, for example, as follows.
Instrument: DSC 220 from Seiko Instruments, Inc.
Sample container: PN/50-020 (15 µl-volume, aluminum-made open pan) and PN/50-021 (aluminum-made lid for crimping)
Sample weight: about 10 mg
Rate of temperature rise and fall: 5° C./min
Measuring temperature range: An optimal temperature range is chosen depending on the wax to be analyzed. A sample is once melted, cooled at a rate of 5° C./min to crystallize, and re-heated at a rate of 5° C./min. The data recorded during the re-heating are used to obtain the melting completion temperature and the melting peak temperature.

Figure 2:
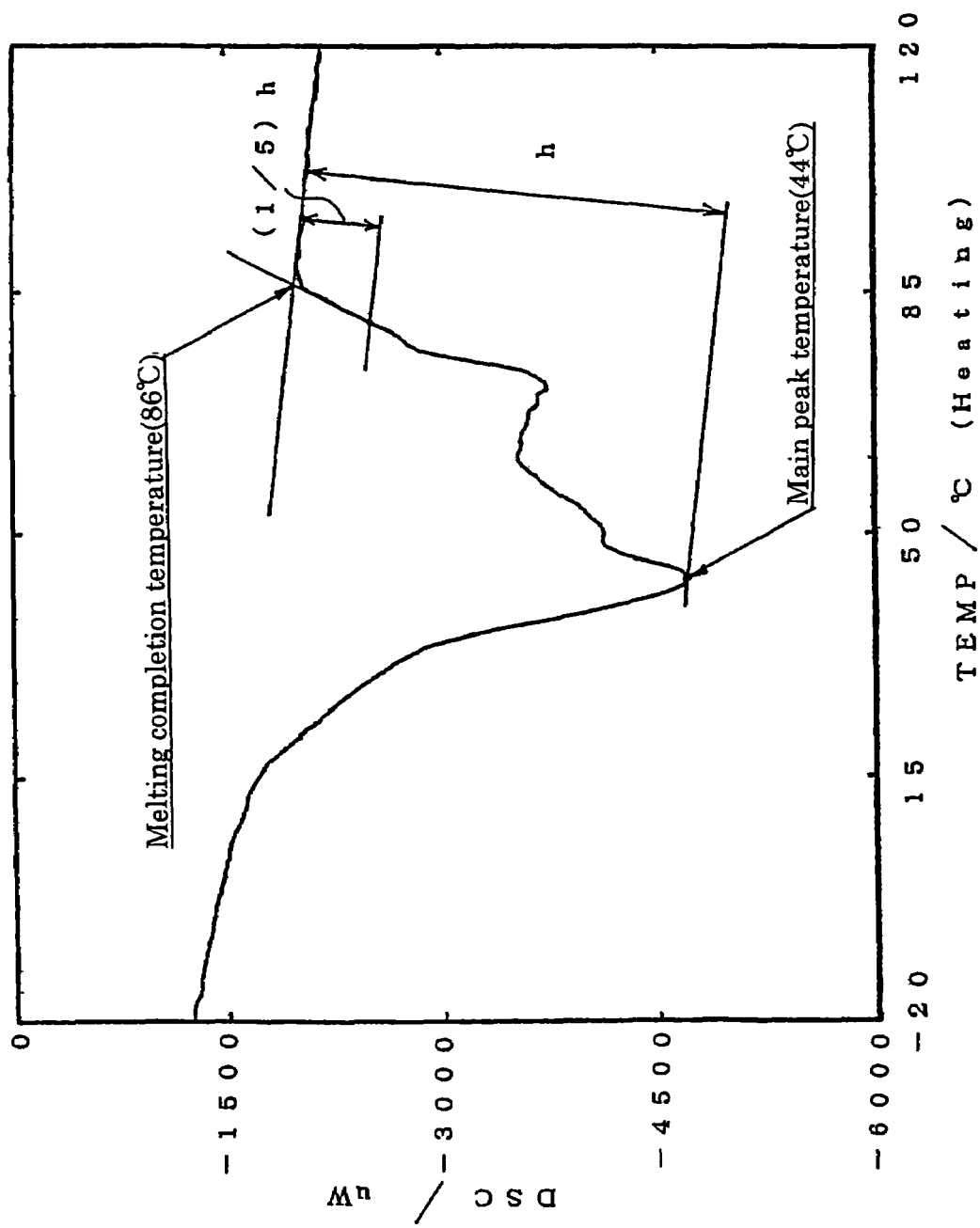
FIG. 2 is a DSC curve illustrating how to obtain a melting completion temperature and a melting peak temperature from a DSC curve.

For example, a sample is subjected to a first temperature rise of from 30° C. to 130° C., maintained at 130° C. for 5 minutes, cooled from 130° C. to −30°, and subjected to a second temperature rise of from 30° C. up to 130° C. Meanwhile, the data are continuously recorded, and the data during the second temperature rise are made use of. Melting completion temperature: As shown in FIG. 2, a tangent to the base line in the higher temperature side of the melting peak is drawn. An inclining line is drawn from the peak toward the higher temperature side in parallel to the tangent. A tangent is drawn at a point apart from that base line by ⅕ the height of from the inclining line to that base line. The temperature of the intersection between the two tangents is taken as the melting completion temperature. When the DSC curve has two or more peaks, the peak at the highest temperature is chosen to obtain the melting completion temperature. Main peak temperature: The peak temperature of the curve is read from the data. When there are two or more peaks, the peak showing the greatest heat of fusion is chosen to obtain the peak temperature.

Since the wax is mixed with the component in the state in which crystals of the wax remain, it is preferred to use a mixing apparatus for mixing a high-viscosity material. Since it is necessary to control the mixing temperature to an optimum temperature lower than the melting completion temperature of the wax in order to obtain a uniform mixed state, a temperature-controllable mixing container is preferred. The mixing apparatus is preferably designed to cool its moving parts, such as a rotor or a screw, as well. From these considerations, mixing is preferably carried out by use of a pressure kneader, an open kneader or a roll kneader.

By following the production process of the present embodiment, the aforementioned organic or inorganic powder can be dispersed in the wax uniformly. When, in particular, a powder having relatively high hydrophilicity is mixed into a highly hydrophobic wax, if the mixing is at or above the melting point of the wax, the powder agglomerates into lumps and cannot be finely dispersed. In contrast, the production process of the present embodiment makes it feasible to mix powder with high dispersibility.

The composition obtained by the process sometimes entraps air bubbles during the step of mixing. In such cases the composition is subjected to deaeration by usual techniques. For example, deaeration is performed by maintaining the composition in a thermostat at or above the melting point of the wax under reduced pressure or by kneading the composition at or above the melting point of the wax under reduced pressure in a mixing apparatus, e.g., a kneader, equipped with evacuation means.

When natural rubber, isoprene rubber, etc. are mixed, the resulting composition is preferably heated to the wax's melting point or higher temperatures to further improve uniformity of the dispersed state in the wax.

According to the process of producing a wax composition according to the present invention, the wax composition of the first embodiment can be produced in a short time at good yield, and the component can be dispersed in the wax uniformly. When a wax is mixed with natural rubber or isoprene rubber, in particular, the natural rubber or isoprene rubber can be dispersed in the wax extremely uniformly even though the wax is in a non-melted state.

The wax composition according to a second embodiment (a biodegradable wax composition) will then be described with reference to its preferred modes.

Containing a wax as a main component, the wax composition of the embodiment exhibits sufficient moistureproofness. The wax composition also exhibits assured biodegradability. Specifically, the wax composition of the embodiment is biodegradable and has a moisture permeability of 3 g·mm/m²·24 hr or less, preferably 2 g·mm/m²·24 hr or less, more preferably 1 g·min/m²·24 hr or less, in an environment of 40° C. and 90% RH. There is no lower limit of the moisture permeability. The lower, the better.

The moisture permeability of the wax composition of the embodiment is a water vapor transmission rate of a film with a prescribed thickness molded of the wax composition, converted to a value of 1 mm thick film, measured in accordance with the dish method (JIS Z0208, condition B). Assuming that moisture permeability is in inverse proportion to film thickness, the converted value of moisture permeability is obtained by multiplying the moisture permeability as determined by the dish method by the film thickness. It is often difficult to measure moisture permeability of a film made solely of the wax composition by the above-specified method. In such cases, a laminate film composed of a biodegradable resin film having a known moisture permeability and a film of the wax composition is prepared for the measurement of moisture permeability of the wax composition. For example, a three-layered film having a structure of biodegradable resin layer (A)/wax composition layer (B)/biodegradable resin layer (C) is prepared, and the moisture permeability d of the three-layered film is measured by the above-described method. Separately, the moisture permeabilities a and c of the biodegradable resin layer (A) and the biodegradable resin layer (C), respectively, are measured in the same manner. The moisture permeability of the wax composition layer (B) being taken as b, the following relationship can be given, in which a, b, c, and d are values as measured but not converted to 1 mm thickness values.

$1/d = 1/a + 1/b + 1/c$

The unknown moisture permeability b of the wax composition layer (B) can be calculated from the relationship.

As previously stated, the wax composition of the embodiment contains a wax as a main component. In order to achieve the above-recited moisture permeability with ease, the wax composition preferably contains the wax in a proportion of 65% to 95% by weight, more preferably 70% to 85% by weight.

In order to secure biodegradability of the wax composition of the embodiment, it is preferred to use a wax having a biodegradability (JIS K6950 or JIS K6953) of 30% or higher, more preferably 50% or higher, most preferably 60% or higher.

The wax preferably has a melting point of 40° C. or higher, more preferably 60° C. or higher, from the standpoint of storage stability of the wax composition and melt-moldings of the wax composition. The melting point of waxes is measured in accordance with JIS K2235-5.3.

Waxes having the above-described various characteristics and preferred for use in the embodiment include plant waxes, animal waxes, and petroleum waxes. Examples of useful waxes are given, e.g., in reference 1 cited supra. Examples of the plant waxes include rice wax, carnauba wax, and candelilla wax. The animal waxes include bees wax, lanolin, and whale wax. The petroleum waxes include microcrystalline wax and paraffin wax. Microcrystalline wax is particularly preferred of these waxes. Synthetic waxes are usable as well as long as they are biodegradable.

In order for the wax composition to exhibit good adhesion to other materials and flexibility, the wax to be used in the wax composition is preferably such that the endothermic value ΔH1 in the lower temperature side than 50° C. is at least 10% of the total endothermic value ΔH2 in DSC, which means that the wax composition contains a wax that melts at relatively low temperatures. It is more preferred that the ΔH1/ΔH2 ratio of the wax be 20% or greater, particularly 30% or greater. With the ΔH1/ΔH2 ratio in the recited range, the wax composition exhibits higher adhesion to biodegradable resins, paper materials, etc. and less suffers from defects such as breaks and cracks due to deformation such as bending. In order for the wax composition to have sufficient heat resistance, the wax to be used in the wax composition is preferably such that the endothermic value ΔH1 in the lower temperature side than 50° C. is 90% or less, more preferably 80% or less, particularly preferably 70% or less, of the total endothermic value ΔH2 in the DSC curve, thereby to suppress reduction in heat resistance. DSC is carried out in the same manner as described with respect to the first embodiment.

The wax composition of the embodiment preferably has a melt flow rate (hereinafter abbreviated as MFR) of 0.1 to 1000 g/10 min, more preferably 0.5 to 100 g/10 min, most preferably 1 to 30 g/10 min, at 125° C. under a load of 1.2 kgf. In other words, the wax composition of the present invention exhibits melt flow characteristics suitable for melt molding using an extruder. Accordingly, the wax composition of the invention can easily be molded into film by T-die extrusion or blown-film extrusion.

Because biodegradable waxes generally have a melting point lower than 100° C., some of the wax compositions of the embodiment are difficult to melt mold due to excessive reduction in viscosity. Incorporating a polymer other than the wax into the composition is a conceivable approach to increase the melt viscosity of that kind of the wax composition, but such tends to impair the moistureproofness of the resulting wax composition. As a result of extensive researches, the present inventors have found that incorporating polyisoprene (synthetic) or natural rubber into the composition as a polymer increases the melt viscosity without reducing the moistureproofness of the wax composition. Use of polyisoprene or natural rubber does not damage the biodegradability of the wax composition because they are decomposable by bacteria living in usual soil. That is, polyisoprene and natural rubber are biodegradable polymers. Besides, incorporating polyisoprene or natural rubber brings about another advantage that molded products obtained from the resulting wax composition exhibit improvements in heat resistance, strength, and flexibility.

While depending on the use of the wax composition, polyisoprene is preferred to natural rubber from various viewpoints including prevention of an allergy, prevention of non-uniformity of the wax composition due to crosslinked gel, prevention of quality variations of the wax composition, such as variations in viscosity, due to molecular weight variations, and prevention of smell and coloration.

The amount of polyisoprene or natural rubber to be compounded into the wax composition preferably ranges 5% to 35% by weight, more preferably 15% to 30% by weight, so as to obtain melt flow characteristics fit for melt molding without impairing the moistureproofness of the wax composition.

The present inventors have ascertained that proper control of the molecular weight of polyisoprene or natural rubber is advantageous for obtaining the wax composition which exhibits melt flow characteristics suitable for melt molding. It has been found that polyisoprene or natural rubber having a weight average molecular weight controlled above 200,000, preferably 400,000, more preferably 700,000 regulates the melt flow characteristics of the wax composition for melt molding. While there is no particular upper limit of the weight average molecular weight from the viewpoint of increasing the melt viscosity, the upper limit preferred for ease in producing the wax composition would be 4,000,000, more preferably 2,000,000. The weight average molecular weight is measured by GPC. More concretely, a wax composition is dissolved in chloroform, and a non-dissolved wax fraction is removed by filtration. The resultant filtrate is analyzed by GPC. The weight average molecular weight of polyisoprene or natural rubber is obtained from the results and a calibration curve prepared using standard polystyrene samples with known molecular weights.

The molecular weight of polyisoprene or natural rubber can be controlled during preparation of the wax composition of the invention. For example, while a wax and polyisoprene or natural rubber are being kneaded, the molecular chains of polyisoprene or natural rubber can be severed by a mechanical shear force under adjusted conditions including kneading time, shear force, and temperature, or the molecular chains can be severed by oxidation reaction induced by the heat of kneading. In general, as kneading continues, polyisoprene or natural rubber reduces in molecular weight, and the wax composition tends to increase in MFR. When heat is applied in the presence of oxygen, the molecular weight can decrease greatly by oxidation reaction. Then, in order to maintain the melt viscosity high, it is preferred (1) to take care not to exert excessive shear to the component to be kneaded or not to heat the component too much, (2) to carry out kneading in an inert gas atmosphere where heat is applied, or (3) to use an appropriate antioxidant.

Another technique for controlling the molecular weight of polyisoprene or natural rubber is moderately crosslinking polyisoprene or natural rubber. This method is particularly effective in increasing the molecular weight of polyisoprene or natural rubber that has once been excessively reduced during kneading with a wax. The crosslinking agent to be used is not limited. For example, addition of lauroyl peroxide in an amount of about 0.1% to 2% by weight based on the uncrosslinked polyisoprene or natural rubber results in controlling the molecular weight of polyisoprene or natural rubber within the recited range. Crosslinking of polyisoprene or natural rubber is easily accomplished by adding a crosslinking agent to the wax composition of the present embodiment having been charged into an extruder for melt molding. It is also possible to mix a wax with previously crosslinked polyisoprene or natural rubber to produce the wax composition.

The wax composition of the embodiment can be processed into pellets, which are fed into an ordinary extruder and melt molded. The pellets are liable to stick to each other depending on the kinds of the wax and other components such as the biodegradable polymer and the compounding ratio. It is therefore recommended to provide the surface of the pellets with an anti-sticking powder. Pelletization can be conducted in a usual manner for producing resin pellets.

The wax composition of the embodiment is prepared through various processes. As an example, a wax and polyisoprene or natural rubber are put into a kneader, such as a pressure kneader, and kneaded under a strong shear force to obtain the wax composition. In another process, polyisoprene or natural rubber is dissolved in a solvent, e.g., n-heptane, and a wax is then dissolved in the solution, followed by removing the solvent by, for example, vaporization. The former process using no solvent is preferred; for it is free from the residual solvent problem, environmentally friendly, and less costly. Considering that polyisoprene and natural rubber tend to markedly reduce their molecular weight through oxidation on being heated, cares should be taken whichever process may be adopted. For example, the heating time should be minimized, or heating should be effected in a nitrogen atmosphere. Where the wax composition is prepared using a solvent, a particular attention is needed because the molecular weight tends to reduce while the solvent is vaporized, which can result in considerable reduction of the melt viscosity.

The wax composition of the embodiment can be applied in, for example, its molten state to the surface of a biodegradable container made of a biodegradable resin or paper.

The wax composition of the embodiment can be used to laminate a paper material, and the layer of the wax composition can be further laminated with a biodegradable resin layer to form a biodegradable laminate.

The wax composition of the embodiment can be melt molded by T-die extrusion or blown-film extrusion to form a moistureproof layer, which is laminated on at least one side thereof with a biodegradable resin layer to obtain a multilayer, moistureproof, and biodegradable film (hereinafter referred to as a biodegradable film of the second embodiment). A preferred example of the biodegradable film is a three-layered laminate film having a biodegradable resin layer on both sides of the moistureproof layer. The biodegradable film exhibits moistureproofness by virtue of the moistureproof layer. The moistureproofness of the biodegradable film is preferably such that the moisture permeability, converted to a value of 1 mm thick film, measured in accordance with the dish method (JIS Z0208, condition B) is 2 g·mm/m$^2$·24 hr or less, more preferably 1 g·mm/m$^2$·24 hr or less. The moisture permeability of the biodegradable film is calculated in the same manner as previously described with respect to the moisture permeability of the wax composition.

Where the biodegradable film of the embodiment is used to laminate the surface of a biodegradable container body, it is preferred for the biodegradable film to have thermoformability. When a biodegradable film, clamped by both ends thereof and heated to a predetermined temperature, can be pulled uniaxially in opposite directions to double its length without breakage, the film is said to be thermoformable. The heating temperature for thermoforming the biodegradable film is decided appropriately according to the biodegradable resin used, the wax forming the moistureproof layer, and the thermoforming method (e.g., vacuum and/or pressure forming or pressing). The heating temperature should be selected so that the biodegradable film is shaped with an acceptable thickness distribution over the whole area while assuring sufficient moistureproofness. It is important for obtaining sufficient moistureproofness to conduct thermoforming at a heating temperature at which unevenness of film thickness can be minimized. A heating temperature satisfying these requirements can be decided by optimization techniques generally practiced by those skilled in the art.

A heating temperature for testing whether or not the biodegradable film is thermoformable should be a temperature at which actual thermoforming can provide similarly satisfactory results. The temperature ranges shown below serve as a measure for optimization. Selecting the temperature condition within these ranges often provides satisfactory results. Where the biodegradable resin is a crystalline resin, the temperature range is from (Tm −40° C.) to (Tm +20° C.), wherein Tm is a melting peak temperature (° C.) obtained from a DSC curve. When there are two or more melting peaks, the melting peak having the highest heat of fusion is chosen. Where the biodegradable resin is an amorphous resin, the range is from Tg (of the resin) to (Tg+50° C.).

In order for the biodegradable film of the embodiment to degrade in a practically acceptable time, it is preferred that the biodegradable film to have a biodegradability (i.e., ultimate aerobic biodegradability according to JIS K6950 or K6953) of 30% or higher, more preferably 50% or higher, most preferably 60% or more. With this preferred biodegradability, the film will degrade in 2 to 3 months in a compost bin, etc.

The biodegradable film of the embodiment is obtained by, for example, melt co-extrusion through a multi-manifold type T-die using the biodegradable wax composition of the embodiment that provides the moistureproof layer and a biodegradable resin that provides the biodegradable resin layer. Since the biodegradable wax composition of the embodiment has flow characteristics suited to melt molding as previously mentioned, the co-extrusion can be successfully accomplished. The resulting extruded film is stretched uniaxially or biaxially, where needed.

The biodegradable film of the embodiment preferably has a total thickness of 10 to 2000 μm, more preferably 20 to 1000 μm, from the standpoint of film strength and formability. The thickness of the biodegradable resin layer in the biodegradable film of the present embodiment can be selected appropriately according to necessity. It is preferably 5 to 1000 μm, more preferably 10 to 500 μm, for film strength and ease of film handling. The thickness of the moistureproof layer is preferably 1 to 500 μm, more preferably 10 to 100 μm, for providing practical moistureproofness and retaining the biodegradable film strength in high temperatures.

The biodegradable film of the embodiment enjoys broad applications. It is used to coat the surface of a main body of a biodegradable container as previously stated. Additionally, it is useful as a packaging film for various applications or as a film for laminating paperboard (biodegradable paper) to produce biodegradable moistureproof paper (e.g., laminate paper). Such biodegradable moistureproof paper can be shaped by bending or forming into biodegradable containers of cup shape, box shape, etc.

The biodegradable resin layer of the biodegradable film according to the second embodiment is preferably made of biodegradable aliphatic polyester resins, biodegradable aliphatic polyester-aromatic polyester copolymer resins, or biodegradable aliphatic polycarbonate resins. Examples of these resins are polyethylene succinate (PES), polybutylene succinate (PBS), polylactic acid (PLA), polyglycolic acid (PGA), polyhydroxybutyrate (PHB), polycaprolactone (PCL), a polycaprolactone-polybutylene succinate mixture or copolymer (PCL/PBS), a polyhydroxybutyrate-polyhydroxyvalerate copolymer (PHB/PHV), a polybutylene succinate-polybutylene adipate mixture or copolymer (PBS/PBA), a polyethylene terephthalate-polyethylene succinate copolymer (PET/PES), and a polybutylene terephthalate-polybutylene adipate copolymer (PBT/PBA). These resins can be used either individually or as a combination of two or more thereof.

In order for the biodegradable film of the embodiment to degrade in a practical time period, the biodegradable resin layer preferably has a biodegradability (i.e., ultimate aerobic biodegradability according to JIS K6950 or K6953) of 30% or higher, more preferably 50% or higher, most preferably 60% or more.

The biodegradable film of the embodiment can be applied to the surface of a biodegradable container to provide a biodegradable container. When the biodegradable film has a double layer structure composed of the moistureproof layer and the biodegradable resin layer, the biodegradable film is disposed with the biodegradable resin layer facing the direction opposite to the container. The container is not particularly limited in material as long as the material is biodegradable. The biodegradability (ultimate aerobic biodegradability according to JIS K6950 or K6953) of the container is preferably 30% or higher, more preferably 50% or higher, most preferably 60% or higher. The material of the container includes fibers, such as natural fiber and biodegradable synthetic fiber, natural polymers, the above-described biodegradable resins, and mixtures of these materials. The natural fiber includes wood pulp fiber, non-wood pulp fiber, silk, and wool. The biodegradable synthetic fiber includes polylactic acid fiber, vinylon, and rayon. The natural polymers include starch and protein. The container is not particularly limited in shape and includes cups, bowls, bottles, plates, boxes, monkey dishes, and cylinders.

The part of the container to be covered or laminated with the biodegradable film is selected appropriately according to the use, the shape, etc. of the container. For example, the inner side and/or the outer side of the container can be laminated. In the case of cups and the like, it is preferred to laminate at least the inner side with the biodegradable film.

The container can be laminated with the biodegradable film by applying an adhesive between the container and the biodegradable film or by direct lamination. The adhesive that can be used is not particularly limited in composition as long as it is biodegradable. Similarly to the biodegradable film, it is preferred for the adhesive to have a biodegradability (i.e., ultimate aerobic biodegradability according to JIS K6950 or K6953) of 30% or higher, more preferably 50% or higher, most preferably 60% or more. Useful adhesives include starch, polyvinyl alcohol, glue, gelatin, casein, unvulcanized natural rubber, and unvulcanized polyisoprene. A biodegradable resin or a natural resin having a lower melting point than the biodegradable resin layer facing to the container is also employable as an adhesive that serves to adhere the biodegradable film to the container on heat melting. In using a solvent type adhesive that develops adhesiveness on evaporation of the solvent, a solution containing an adhesive component is applied to at least one of the biodegradable film and the container. It is possible to bond the biodegradable film and the container's surface by forming a layer of the adhesive component on one of them and applying the solvent to the other. Direct lamination can be carried out by, for example, disposing the biodegradable film on the inner side of the container and vacuum- or pressure-forming the film while heating the container from the outer side.

The wax composition according to a embodiment will be described with reference to its preferred modes.

The wax composition of the third embodiment contains a high-melting wax component having an endothermic peak at 100° C. or higher in DSC and a low-melting wax component having an endothermic peak at 40° C. or higher and lower than 100° C. in DSC. The wax composition contains these two wax components as main components. The expression "main components" as used herein means that the total content of the high-melting wax component and the low-melting wax component forms a larger proportion in terms of volume fraction than the content of any other component of the composition. Containing these wax components as main components, the composition develops sufficient moistureproof performance. The total volume fraction of the two wax components is preferably higher than 40% by weight, more preferably higher than 50% by weight, for obtaining higher moistureproofness.

The high-melting wax component having an endothermic peak at 100° C. or higher in DSC (hereinafter simply referred to as "high-melting wax component") is a component having an endothermic peak in the region of 100° C. or higher of the DSC curve measured in temperature rise at a rate of 5° C./min. The low-melting wax component having an endothermic peak at 40° C. or higher and lower than 100° C. in DSC (hereinafter simply referred to as "low-melting wax component") is a component having an endothermic peak in the region of 40° C. or higher and lower than 100° C. of the DSC curve measured under the same condition as described above. The endothermic peaks of the two wax components are attributed to fusion of crystals.

In the embodiment, DSC is carried out in the same manner as in the first embodiment, except for using as a sample a wax composition containing the high-melting wax component, the low-melting wax component, and a polymer.

The moisture permeability of the wax composition of the embodiment can be calculated in the same manner as described supra.

As stated, the wax composition of the embodiment contains the high-melting wax component and the low-melting wax component. A wax composition containing the low-melting wax component as a sole wax component reduces in viscosity when melted, which can make processing such as melt molding difficult. A combined use of the high-melting wax component brings about improved processability in melt molding by T-die extrusion or blown-film extrusion or other processings while suppressing reduction of the moistureproofness.

The high-melting wax component and the low-melting wax component are preferably of different kinds.

The endothermic peak temperature of the high-melting wax component is preferably 120° to 250° C., more preferably 150° to 200° C., and that of the low-melting wax component is preferably 40° to 90° C., more preferably 50° to 80° C. The endothermic peak temperature difference between the two wax components is preferably 20° to 200° C., more preferably 40° to 180° C., most preferably 50° to 160° C.

In order for the wax composition of the embodiment to exhibit a high melt viscosity assuring satisfactory processability, the wax composition is preferably such that the ratio of the endothermic value ΔH in the region higher than 100° C. to the endothermic value ΔH in the region lower than 100° C. in the DSC curve measured on a sample of the wax composition (temperature rise rate: 5° C./min) is 0.1 to 5.0, more preferably 0.2 to 4.0, most preferably 0.2 to 3.0. The DSC is carried out using as a sample the wax composition containing the high-melting wax component, the low-melting wax component, and a polymer.

Waxes that are preferably used as the high-melting wax component include N-substituted fatty acid amides, such as N,N'-ethylenebislauramide, N,N'-ethylenebisstearamide, N,N'-methylenebisstearamide, N,N'-ethylenebis-12-hydroxystearamide, N-methylol stearamide, and N,N'-distearylterephthalamide; fatty acid amides, such as 12-hydroxystearamide; and metal soaps, such as lithium 12-hydroxystearate and calcium 12-hydroxystearate. N-Substituted fatty acid amides having an endothermic peak at 130° C. or higher are preferred among them for securing a broader temperature range in which satisfactory processability is exhibited. In particular, N,N'-ethylenebisamides having 6 to 18 carbon atoms in the fatty acid moiety are preferred. Mixed fatty acid amides prepared from a mixture of fatty acids different in carbon atom number are also preferred. While biodegradable ones are preferred of these waxes, non-biodegradable ones are also usable. Where biodegradability is demanded, it is preferred to use a biodegradable wax having a biodegradability (i.e., ultimate aerobic biodegradability according to JIS K6950 or K6953) of 30% or higher, more preferably 50% or higher, most preferably 60% or more.

Waxes that are preferably used as the low-melting wax component include plant waxes, animal waxes, and petroleum waxes. Examples of useful waxes are given, e.g., in reference 1 cited supra.

Examples of the plant waxes include rice wax, carnauba wax, and candelilla wax. The animal waxes include bees wax, lanolin, and whale wax. The petroleum waxes include microcrystalline wax and paraffin wax. Microcrystalline wax is particularly preferred of these waxes. While all these waxes are biodegradable, non-biodegradable waxes are usable as well.

The wax composition of the third embodiment contains a polymer in addition to the wax components including the high-melting wax component and the low-melting wax component. A wax composition containing only the wax components reduces in viscosity when melted, which can make processing such as melt molding difficult. Therefore, a polymer other than the wax components is compounded.

The polymers useful in the wax composition of the first embodiment can be used in the embodiment as well.

Of the previously recited polymers preferred are those amorphous and compatible with the waxes at temperatures higher than the waxes' melting points. Polyisoprene or natural rubber is particularly preferred.

Incorporating a polymer into a wax composition is an approach to increase the melt viscosity of the wax composition, but such tends to impair the moistureproofness of the resulting wax composition. As a result of extensive researches, the present inventors have found that incorporating polyisoprene or natural rubber into the composition as a polymer increases the melt viscosity without reducing the moistureproofness of the wax composition. Where combined with biodegradable waxes, polyisoprene or natural rubber provides a biodegradable wax composition as described later. Besides, incorporating polyisoprene or natural rubber brings about an additional advantage that molded products obtained from the resulting wax composition exhibit improved heat resistance and increased strength.

In order to obtain melt flow characteristics fit for melt molding without impairing the moistureproofness the wax composition, the amount of the polymer such as polyisoprene or natural rubber to be compounded into the wax composition is preferably 5% to 35% by weight, more preferably 15% to 30% by weight.

The present inventors have ascertained that proper control of the molecular weight of polyisoprene or natural rubber is advantageous for making the wax composition exhibit melt flow characteristics suitable for melt molding. For example, polyisoprene having a weight average molecular weight controlled to higher than 200,000, preferably higher than 400,000, more preferably higher than 700,000 regulates the melt flow characteristics of the wax composition for melt molding. While there is no particular upper limit of the weight average molecular weight from the viewpoint of increasing the melt viscosity, the upper limit preferred for ease in producing the wax composition would be 4,000,000, more preferably 2,000,000. The weight average molecular weight is measured by GPC. More concretely, a wax composition is dissolved in chloroform, and non-dissolved wax is removed by filtration. The resultant filtrate is analyzed by GPC. The weight average molecular weight is obtained from the results and a calibration curve prepared using standard polystyrene samples with known molecular weights.

For obtaining biodegradable moistureproof articles including moistureproof film and moistureproof containers, it is desirable that all of the high-melting wax component, the low-melting wax component, and the polymer constituting the wax composition of the embodiment be biodegradable.

In order for the biodegradable wax composition to secure its biodegradability, it is preferred that each of the wax as the high-melting wax component and the wax as the low-melting wax component have a biodegradability (JIS K6950 or 6953) of 30% or higher, more preferably 50% or higher, most preferably 60% or higher.

The polymer is preferably the above-described polyisoprene or natural rubber. Use of polyisoprene or natural rubber does not damage the biodegradability of the biodegradable wax composition because they are decomposable by bacteria living in usual soil.

The wax composition of the embodiment is suitable for melt molding such as T-die extrusion or blown-film extrusion. To have improved processability in melt molding or other processings, it is usually preferred for the composition to have an MFR of 0.1 to 1000 g/10 min, more preferably 0.5 to 100 g/10 min, most preferably 1 to 30 g/10 min, at 125° C. and 1.2 kgf.

To improve processability in melt molding and other processings at higher temperatures, it is preferred for the composition to have an MFR of 0.1 to 1000 g/10 min, more preferably 0.5 to 100 g/10 min, most preferably 1 to 30 g/10 min, at 150° C. and 1.2 kgf.

The wax composition of the embodiment can be prepared through various methods. As an example, a wax as the high-melting wax component, a wax as the low-melting wax component, and the polymer (e.g., polyisoprene or natural rubber) are put into a kneader, such as a pressure kneader, and kneaded under a strong shear force to obtain the wax composition. In another method, the polymer (e.g., polyisoprene or natural rubber) is dissolved in a solvent, e.g., n-heptane, and the wax components are then dissolved in the solution, followed by solvent removal by, for example, vaporization.

As previously mentioned, the wax composition of the present embodiment can be applied in the molten state to, for example, the surface of a container made of a biodegradable resin or paper. The wax composition of the present invention can be melt molded by T-die extrusion or blown-film extrusion to form a moistureproof layer, which is laminated, on at least one side thereof, with a resin layer or paper to provide a multilayer moistureproof film or moistureproof paper.

The process of producing a moistureproof article according to the present invention will then be described with reference to its preferred embodiments. The moistureproof article that can be produced by this process includes the above-described moistureproof containers, film, and paper.

In an embodiment of the process of producing a moistureproof article, the process is for producing a laminate and includes the steps of melting the wax composition of the third embodiment by heating to a temperature of 100° C. or higher and applying the molten wax composition to a resin sheet, a resin film, paper or a container made of a resin or paper to form a layer of the wax composition. The process is characterized in that the heating temperature is such that the ratio of the endothermic value in the region higher than the heating temperature to the endothermic value in the region lower than the heating temperature in a DSC curve of the wax composition (temperature rise rate: 5° C./min) is 0.1 to 5.0.

In another embodiment of the process of producing a moistureproof article, the process is for producing a laminate and includes the step of melt molding the wax composition of the third embodiment into a film or a sheet by T-die extrusion or blown-film extrusion by use of an extruder. The process is characterized in that the temperature of the wax composition being extruded from an extruder, etc. is such that the ratio of the endothermic value in the region higher than the temperature to the endothermic value in the region lower than the temperature in a DSC curve of the wax composition (temperature rise rate: 5° C./min) is 0.1 to 5.0.

In either embodiment, the ratio of the endothermic value in the region higher than the temperature to the endothermic value in the region lower than the temperature is preferably 0.2 to 4.0, more preferably 0.2 to 3.0.

The moistureproof film of the present invention will be described with its preferred embodiment.

The moistureproof film of the present embodiment is a three-layered, biodegradable, moistureproof film having a moistureproof layer formed by melt molding the wax composition of the third embodiment of which the two wax components and the polymer are biodegradable and a biodegradable resin layer provided on both sides of the moistureproof layer. The moistureproofness of the moistureproof film owes to the existence of the moistureproof layer. The moistureproofness of the film is preferably such that the moisture permeability, converted to a value of 1 mm thick film, measured in accordance with the dish method (JIS Z0208, condition B) is 3 g·mm/m$^2$·24 hr or less, more preferably 2 g·mm/m$^2$·24 hr or less, most preferably 1 g·mm/m$^2$·24 hr or less. The moisture permeability is calculated in the same manner as described supra.

The biodegradable moistureproof film (hereinafter simply referred to as "biodegradable film") will further be described. Unless inconsistent with the context, the following description also applies to a non-biodegradable moistureproof film.

Where the biodegradable film of the present embodiment is used to laminate the surface of a biodegradable container, it is preferred for the biodegradable film to have thermoformability similarly to the biodegradable film of the first embodiment. When a biodegradable film clamped by both ends thereof and heated to a predetermined temperature can be pulled uniaxially in opposite directions to double its length without breakage, the film is said to be thermoformable. The heating temperature for thermoforming the biodegradable film is decided appropriately according to the biodegradable resin used, the waxes forming the moistureproof layer, and the thermoforming technique (e.g., vacuum and/or pressure forming or pressing). The heating temperature should be selected so that the biodegradable film is shaped with an acceptable thickness distribution over the whole area while assuring sufficient moistureproofness. It is important for obtaining sufficient moistureproofness to conduct thermoforming at a heating temperature at which unevenness of film thickness can be suppressed. A heating temperature satisfying these requirements can be decided by optimization techniques generally followed by those skilled in the art.

A heating temperature used for testing whether or not the biodegradable film is thermoformable should be a temperature at which actual thermoforming can provide similarly satisfactory results. The temperature ranges shown below serve as a measure for optimization. Selecting the temperature condition within these ranges often provides satisfactory results. Where the biodegradable resin is a crystalline resin, the temperature range is from (Tm −40° C.) to (Tm +20° C.), wherein Tm is a melting peak temperature (° C.) obtained from a DSC curve. When there are two or more melting peaks, the melting peak having the highest heat of fusion is chosen. Where the biodegradable resin is an amorphous resin, the range is from Tg (of the resin) to (Tg+50° C.).

A preferred biodegradability of the biodegradable film of the present embodiment is the same as for the biodegradable film of the second embodiment.

The biodegradable film of the present embodiment can be obtained by the same molding method as for the biodegradable film of the second embodiment. A preferred thickness and preferred application of the biodegradable film of the present embodiment are also the same as for the biodegradable film of the second embodiment.

The biodegradable resin layer of the biodegradable film according to the present embodiment can be made of the same biodegradable resins as used in the biodegradable film of the foregoing embodiments. A preferred biodegradability of the biodegradable resin layer in the present embodiment is the same as that of the biodegradable resin layer in the biodegradable film of the foregoing embodiments.

The biodegradable film of the present embodiment can be used to laminate a biodegradable container to provide a biodegradable container. Where the biodegradable film is a double layered laminate composed of the moistureproof layer and the biodegradable resin layer, the biodegradable film is disposed with its biodegradable resin layer facing the direction opposite to the container. The material making the container body is not particularly limited as long as it is biodegradable. The container preferably has a biodegradability (i.e., ultimate aerobic biodegradability according to JIS K6950 or K6953) of 30% or higher, more preferably 50% or higher, most preferably 60% or higher. The material of the container includes fibers such as natural fiber and biodegradable synthetic fiber, natural polymers, the above-described biodegradable resins, and mixtures of these materials. The natural fiber includes wood pulp fiber, non-wood pulp fiber, silk, and wool. The biodegradable synthetic fiber includes polylactic acid fiber, vinylon, and rayon. The natural polymers include starch and protein. The container is not particularly limited in shape and includes cups, bowls, bottles, plates, boxes, shes and cylinders.

The part of the container to be laminated with the biodegradable film is selected appropriately according to the use, the shape, etc. of the container. For example, the inner side and/or the outer side of a container can be laminated. In the case of cups and the like, it is preferred to laminate at least the inner side with the biodegradable film.

The container can be laminated with the biodegradable film of the present embodiment in the same manner as described in the foregoing embodiments.

The present invention will now be illustrated in greater detail by way of Examples, but it should be understood that the invention is not deemed to be limited thereto.

Wax compositions were prepared in Examples 1-1 to 1-3 and Comparative Examples 1-1 to 1-2. The resulting compositions were evaluated for dispersion uniformity as follows. The composition was deaerated by heating at or above the melting point of the wax. The molten composition was spread to a thickness of about 5 mm and observed with the naked eye to see if particles of the component mixed into the wax remained. When any particulate substance was observed, the substance was regarded non-dispersed.

EXAMPLE 1-1

In a kneading container of Laboplastomill (30C150 supplied by Toyo Seiki Seisakusho) were charged 44 g of microcrystalline wax (Hi-Mic-1070, available from Nippon Seiro Co., Ltd.; melting completion temperature: 86° C.; main peak temperature: 44° C.) and 11 g of masticated, unvulcanized natural rubber (hereinafter simply referred to as natural rubber) and kneaded at 30 rpm for 10 minutes. The reading on the thermometer set inside the kneading container was 22° C. before charging. All the heaters attached to the kneader were kept off until the end of the kneading. After completion of the kneading, the reading of the thermometer inside the container was 37° C. The ΔH' at 37° C. was 12% of ΔH. The kneading was carried out without using any solvent.

The resulting composition looked white with air bubbles and was proved to have the components dispersed uniformly. The composition was deaerated in a nitrogen stream in a dryer at 110° C. and −500 mmHg. The composition was again checked for the disperse state in its molten state and found to be a clear uniform composition. The presence of non-dispersed natural rubber was not confirmed.

EXAMPLE 1-2

A wax composition was obtained in the same manner as in Example 1-1, except for replacing natural rubber with isoprene rubber (Nipol-IR2200, available from Zeon Corp.). At the end of the kneading, the reading of the thermometer inside the kneading container was 39° C. ΔH' at 39° C. was 16% of ΔH. After the kneading (during which the heaters were kept off), the heater of the kneading container was turned on to raise the inside temperature to 85° C., at which the mixture was further kneaded for 7.5 minutes. The disperse state of the resulting composition in its molten state was observed. It was found that the composition had been deaerated by the kneading at 85° C. and became a clear uniform composition. The presence of non-dispersed isoprene was not observed.

EXAMPLE 1-3

A pressure kneader (DS 0.3-3, supplied by Moriyama Manufacturing Co., Ltd.) was used. Into the kneading container of the pressure kneader were put 1800 g of microcrystalline wax (Hi-Mic-1070, available from Nippon Seiro Co., Ltd.) and 600 g of isoprene rubber (Nipol-IR2200 from Zeon Corp.) and kneaded at 20 rpm for 5 minutes. To the mixture was added an additional 600 g portion of the same wax, followed by kneading for 10 minutes. The kneading was performed while passing cooling water at 10° C. around the mixing container and the rotor, with all the heaters turned off. The highest temperature the mixture reached during kneading was 37° C. (the reading on the thermometer set inside the kneading container). The temperature of the composition after the end of the kneading was 36° to 42° C. as measured with a contact thermometer. The ΔH' at 36° C. and 42° C. were 10% and 22%, respectively, of the ΔH.

The resulting composition looked white with air bubbles and was proved to have a uniform disperse state. The composition was deaerated in the same manner as in Example 1-1. The composition was again checked for the disperse state in its molten state and found to be a clear uniform composition with no presence of non-dispersed isoprene rubber confirmed.

EXAMPLE 1-4

Kneading was carried out in the same manner as in Example 1-3, except for replacing the microcrystalline wax Hi-Mic-1070 (from Nippon Seiro Co., Ltd.) with microcrystalline wax Hi-Mic-1080 (available from Nippon Seiro Co., Ltd.; melting completion temperature: 86° C.; main peak temperature: 59° C.). The highest temperature the mixture reached during kneading was 45° C. (the reading on the thermometer set inside the mixing container). The temperature of the composition after the end of the kneading was 37° to 50° C. as measured with a contact thermometer. The ΔH' at 37° C. and 50° C. were 0% and 5%, respectively, of the ΔH.

The resulting composition looked white with air bubbles and was proved to have a uniform disperse state. The composition was deaerated in the same manner as in Example 1-1 and again checked for the disperse state in its molten state. It was a clear uniform composition with no presence of non-dispersed isoprene rubber confirmed.

EXAMPLE 1-5

A wax composition was obtained in the same manner as in Example 1-1, except for replacing natural rubber with an inorganic filler, lipophilic smectite (Lucentite SAN, available from Co-Op Chemical Co., Ltd.). The reading of the thermometer inside the kneading container was 35° C. at the end of the kneading. The ΔH' at 35° C. was 9% of the ΔH. The resulting composition was white overall and was proved to have a uniform disperse state. The composition was deaerated in the same manner as in Example 1-1. The composition was again checked for the disperse state in its molten state and found to be a milky white, uniform composition.

COMPARATIVE EXAMPLE 1-1

Kneading was carried out in the same manner as in Example 1-1, except for the heater of the kneading container was set at 90° C. The wax melted to greatly decrease the viscosity of the mixture. As a result, the natural rubber stuck to the rotor and the inner wall of the kneading container without being dispersed, and continuation of kneading brought about no change to that state.

COMPARATIVE EXAMPLE 1-2

A coating composition consisting of 80 wt % of cyclohexane, 16 wt % of candelilla wax, and 4 wt % of natural rubber was prepared according to the following procedures. Deproteinated natural rubber (available from Sumitomo Rubber Industries, Ltd.) was dissolved in cyclohexane by stirring for 3 days. Finely ground candelilla wax (available from Cerarica Noda Co., Ltd.; melting point: 64° C.) was added to the solution and dissolved at 70° C. to prepare a coating composition. The resulting coating composition (solids content: 20 wt %) was applied to paper (coated board) with a #40 bar coater at room temperature and air dried. After the coating dried, the coating composition was again applied with the same bar coater and air dried. After completion of the second application, the residual cyclohexane content in the coating film was measured as follows. One gram of the coating film was scraped off and dissolved in 10 ml of toluene. The resulting sample solution was analyzed on a gas chromatograph (Agilent 6890) equipped with a flame ionization detector to determine the residual cyclohexane. The results obtained are shown in Table 1-1. Table 1-1 shows that the coating film of the composition prepared by the above-described process had a residual cyclohexane content as high as 0.1 wt % even on the 7th day after application.

TABLE 1-1

| Number of Days after Application | Cyclohexane Content in Coating Film (wt %) |
|---|---|
| 1 | 14 |
| 2 | 2 |
| 3 | 0.5 |
| 7 | 0.1 |

COMPARATIVE EXAMPLE 1-3

Mixing was carried out in the same manner as in Example 1-5, except for setting the heater of the mixing container at 90° C. The filler remained agglomerated and was impossible to disperse in the wax uniformly.

EXAMPLE 2-1

Figure 3:
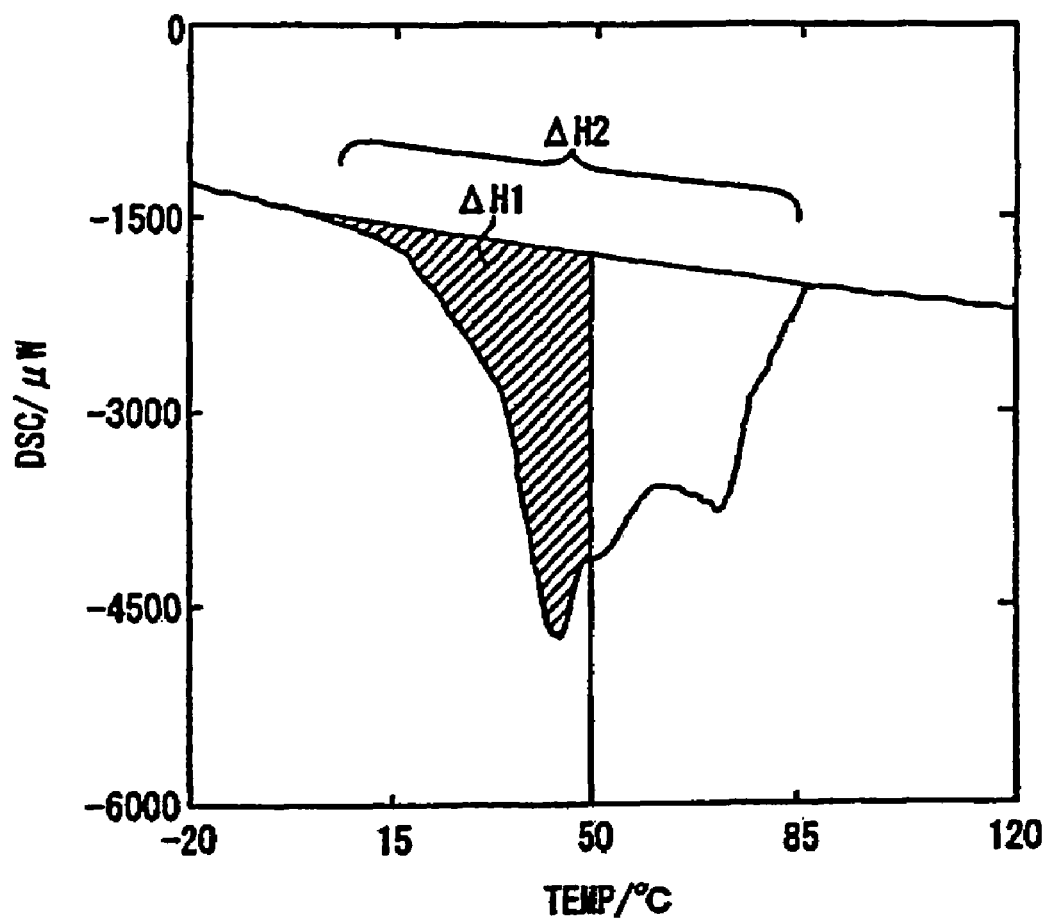
FIG. 3 is a DSC curve of the wax used in Example 2-1.

Microcrystalline wax (Hi-Mic-1080 (trade name) available from Nippon Seiro Co., Ltd.) was used as a wax. Polyisoprene (IR2200, from Zeon Corp.) was used as a biodegradable polymer. The wax and polyisoprene were mixed at a weight ratio of 7:3 and kneaded in a pressure kneader jacketed with cooling water at 10° C. for 15 minutes to give a wax composition. Containing air bubbles, the resulting composition was deaerated in a vacuum oven at 100° C. in a nitrogen stream for 24 hours. The DSC curve of the wax composition is represented in FIG. 3.

A layer of the wax composition was sandwiched between a pair of films of a biodegradable resin (PHB05 available from Daicel Chemical Industries, Ltd.; a polyblend of polycaprolactone and polyethylene succinate), and the laminate was pressed on a pressing machine to give a three-layered biodegradable film. The resulting biodegradable film had a total thickness of 400 μm, in which the thicknesses of the wax composition layer and each biodegradable resin film were 200 μm and 100 μm, respectively.

EXAMPLE 2-2

A wax composition and a three-layered biodegradable film were prepared in the same manner as in Example 2-1, except for mixing the wax and polyisoprene at a weight ratio of 8:2.

EXAMPLE 2-3

To the wax composition obtained in Example 2-2 was added 1 wt % lauroyl peroxide as a crosslinking agent, and the mixture was kneaded in a Laboplastomill. The mixture was heated in an oven at 100° C. a nitrogen atmosphere for 40 hours to provide a wax composition having the polyisoprene crosslinked. A three-layered biodegradable film was prepared using the resulting wax composition.

COMPARATIVE EXAMPLE 2-1

A wax composition and a three-layered biodegradable film were prepared in the same manner as in Example 2-1, except for changing the kneading time to 60 minutes.

EXAMPLE 2-4

The wax composition obtained in Example 2-1 and the biodegradable resin PHB05 (a polyblend of polycaprolactone and polyethylene succinate, available from Daicel Chemical Industries, Ltd.) were co-extruded through a T-die to obtain a three-layered biodegradable film having a pair of layers of the biodegradable resin and a moistureproof layer sandwiched therebetween. The T-die used was of a multi-manifold type for three layers of three kinds. In Example 2-4, the deaerated wax composition prepared in Example 2-1 was refrigerated and crushed in a crusher into pellets having a particle size of about 3 mm. To 100 parts by weight of the pellets was adhered 1 part by weight of anhydrous silica particles (R927, available from Nippon Aerosil Co., Ltd.; average particle size: 12 μm) as an antiblocking agent. The moistureproof layer of the resulting biodegradable film was made of the wax composition, and the two biodegradable resin layers were made of the biodegradable resin. The resulting biodegradable film had a total thickness of 400 μm, in which the thicknesses of the moistureproof layer and each of the biodegradable resin layers were 200 μm and 100 μm, respectively.

EXAMPLE 2-5

A three-layered biodegradable film was prepared in the same manner as in Example 2-4, except for replacing the wax composition obtained in Example 2-1 with the wax composition obtained in Example 2-2.

COMPARATIVE EXAMPLE 2-2

In an attempt to prepare a three-layered biodegradable film, the same procedures as in Example 2-4 were followed, except for replacing the wax composition obtained in Example 2-1 with a wax composition prepared by dissolving and thoroughly mixing Hi-Mic-1070 and deproteinated natural rubber (from Sumitomo Rubber Industries, Ltd.) at a weight ratio of 9:1 in n-heptane and vaporizing n-heptane by heating at 120° C. for 72 hours. However, when extruded, the wax composition was localized in the middle of the die, while the biodegradable resin was localized in both ends of the die, resulting in a failure to mold a three-layered film. The wax composition used in extrusion had an MFR of 2000 g/10 min.

EXAMPLE 2-6

A double layered biodegradable film composed of a moistureproof layer and a biodegradable resin layer was prepared by pressing using the wax composition obtained in Example 2-1 and film of a biodegradable resin PHB05 (a polyblend of polycaprolactone and polyethylene succinate, available from Daicel Chemical Industries, Ltd.). The moistureproof layer of the resulting biodegradable film was made of the wax composition, and the biodegradable resin layer was made of the biodegradable resin. The resulting biodegradable film had a total thickness of 200 μm, in which the thicknesses of the moistureproof layer and the biodegradable resin layer were 100 μm and 100 μm, respectively. Paper (coated board having a basis weight of 370 g/m$^2$) was laminated with the resulting film by means of a pressing machine to give a laminate composed of paper/moistureproof layer/biodegradable resin layer. The moistureproof layer of the resulting laminate had a uniform thickness, showing little penetration of the wax composition into the paper.

EXAMPLE 2-7

The inner side of a cup-shaped pulp molded container body was laminated with the biodegradable film of Example 2-4 by vacuum forming to make a biodegradable cup. The container body measured 90 mm in inner diameter at the top opening, 60 mm in inner diameter at the bottom, and 100 mm in height and had an inner surface area of about 300 cm$^2$.

Performance Evaluation:

The wax compositions obtained in Examples 2-1 to 2-3 and Comparative Example 2-1 were measured for moisture permeability and MFR by the aforementioned methods. The weight average molecular weight of the polyisoprene used was measured. The results of the measurements are shown in Table 2-1. The biodegradable films of Examples 2-1 to 2-3 and Comparative example 2-1 were evaluated for adhesion and flexibility in accordance with the methods described below. The results of the evaluation are shown in Table 2-1. The biodegradable films of Examples 2-4 and 2-5 and Comparative Example 2-2 were measured for moisture permeability by the aforementioned method and evaluated for formability. The results obtained are shown in Table 2-2. The moisture permeability of the wax compositions was calculate from the measured moisture permeability of the three-layered film and that of a 100 μm thick film of the biodegradable resin PHB05 (=132 g/m$^2$·24 hr). The moisture permeability, not reduced to unit thickness, of the laminate composed of paper/moistureproof layer/biodegradable resin layer (Example 2-6) was 10 g/m$^2$·24 hr. The biodegradable container (Example 2-7) had an average moisture permeability of 0.8 g·mm/m$^2$·24 hr as calculated in accordance with the method described below.

Evaluation of Adhesion of Biodegradable Film:

The resulting three-layered film was cut into a 20 mm wide strip, and an end of the strip was bent by hand. The film that suffered from delamination at the interface between the wax composition layer and the biodegradable resin layer was judged "no good", and the film that did not was judged "good".

Evaluation of Flexibility of Wax Composition Layer in Biodegradable Film:

The resulting three-layered film was cut into a 20 mm wide strip, and the strip was bent 90°. The film that developed cracking in the wax composition layer was judged "no good", while the film that did not was judged "good".

Measurement of Average Moisture Permeability of Biodegradable Container:

Fifty grams of calcium chloride was put into the biodegradable container. A glass plate was placed on the opening of the container, and the gap between the rim and the glass plate was sealed with wax. The sealed container was left to stand in a thermohygrostat at 40° C. and 90% RH for one week. The difference in net weight (the total weight of the container, calcium chloride, wax and glass plate) between before and after leaving to stand was obtained. The average moisture permeability of the container was calculated according to the following equation assuming the areal stretch ratio of the film in vacuum forming to be 400% and the inner surface area of the cup to be 0.03 m$^2$.

Average moisture permeability=[weight difference (g) between before and after leaving to stand/(number of days of leaving to stand×inner surface area of cup (m$^2$))]×(film thickness (mm) before forming/stretch ratio (%) of film)

As is apparent from Table 2-1, it is seen that the wax compositions of Examples 2-1 and 2-3 have low moisture permeability and a low MFR indicating high melt viscosity. It is also seen that the wax composition of Example 2-2 exhibits high moistureproofness and has a high MFR indicative of low melt viscosity. The results in Table 2-2 clearly prove that a uniform multilayer film having low moisture permeability can be obtained by co-extrusion using the wax composition having a high MFR. The results in Table 2-1 clearly show that the wax compositions of Examples provide biodegradable films with improved adhesion and improved flexibility. While not shown in the Tables, the biodegradable films of Examples suffered from no problem of performance such as moistureproofness even in an environment at 40° C., proving that the wax compositions have sufficient heat resistance. It was ascertained that the biodegradable films provided laminates or biodegradable containers having paper with low moisture permeability as a base. While not shown in Tables, all the wax compositions, biodegradable films, and biodegradable containers obtained in these Examples were confirmed to be biodegradable. It was also confirmed that addition of an antiblocking agent to pellets in the production of a three-layered film by co-extrusion is effective in preventing the wax composition from sticking to the pellet feed portion of an extruder and preventing the pellets from sticking together compared with no addition of an antiblocking agent.

TABLE 2-1

| | Wax Composition | | | | | | Biodegradable Film | |
|---|---|---|---|---|---|---|---|---|
| | Moisture Permeability (g·mm/m$^2$·24 h) | MFR (g/10 min) | Wax (wt %) | Polyisoprene (wt %) | Wt. Av. Mol. Wt. of Polyisoprene | ΔH1/ΔH2 (%) | Adhesion | Flexibility |
| Example 2-1 | 1.5 | 40 | 70 | 30 | 490,000 | 49 | Good | Good |
| Example 2-2 | 1.2 | 790 | 80 | 20 | 520,000 | 49 | Good | Good |
| Example 2-3 | 1.2 | 14 | 80 | 20 | 560,000 | 49 | Good | Good |
| Compara. Example 2-1 | 1.2 | ≧2000 | 70 | 30 | 190,000 | — | No good | No good |

TABLE 2-2

| | Biodegradable Film | |
|---|---|---|
| | Formability | Moisture Permeability (g·mm/m²·24 h) |
| Example 2-4 | Good | 3 |
| Example 2-5 | Good | 2.4 |
| Comparative Example 2-2 | No good | Unmeasurable |

EXAMPLE 3-1

(1) Preparation of Wax Composition

Kao Wax EB-FF (trade name of ethylenebis (fatty acid amide) available from Kao Corp.) and Hi-Mic-1045 (trade name of microcrystalline wax available from Nippon Seiro Co., Ltd.) were mixed at a weight ratio of 50:50 at 150° C. The EB-FF alone was calorimetrically analyzed with a DSC (temperature rise rate: 5° C./min) to find that the endothermic peak temperature (melting point) was 146° C. The resulting mixed wax and polyisoprene were mixed at a weight ratio of 8:2 and kneaded in a pressure kneader to prepare a master batch.

The resulting wax composition was analyzed with a DSC at a temperature rise rate of 5° C./min. The DSC curve showed a large endothermic peak at around 140° C. assigned to the former wax and a large endothermic peak (main peak) at about 42° C. assigned to the latter wax. The ratio of the endothermic value ΔH in the region higher than 100° C. to the endothermic value ΔH in the region lower than 100° C., the MFR at 125° C. under 1.2 kgf, and the MFR at 150° C. under 1.2 kgf are shown in Table 3-2.

Figure 4:
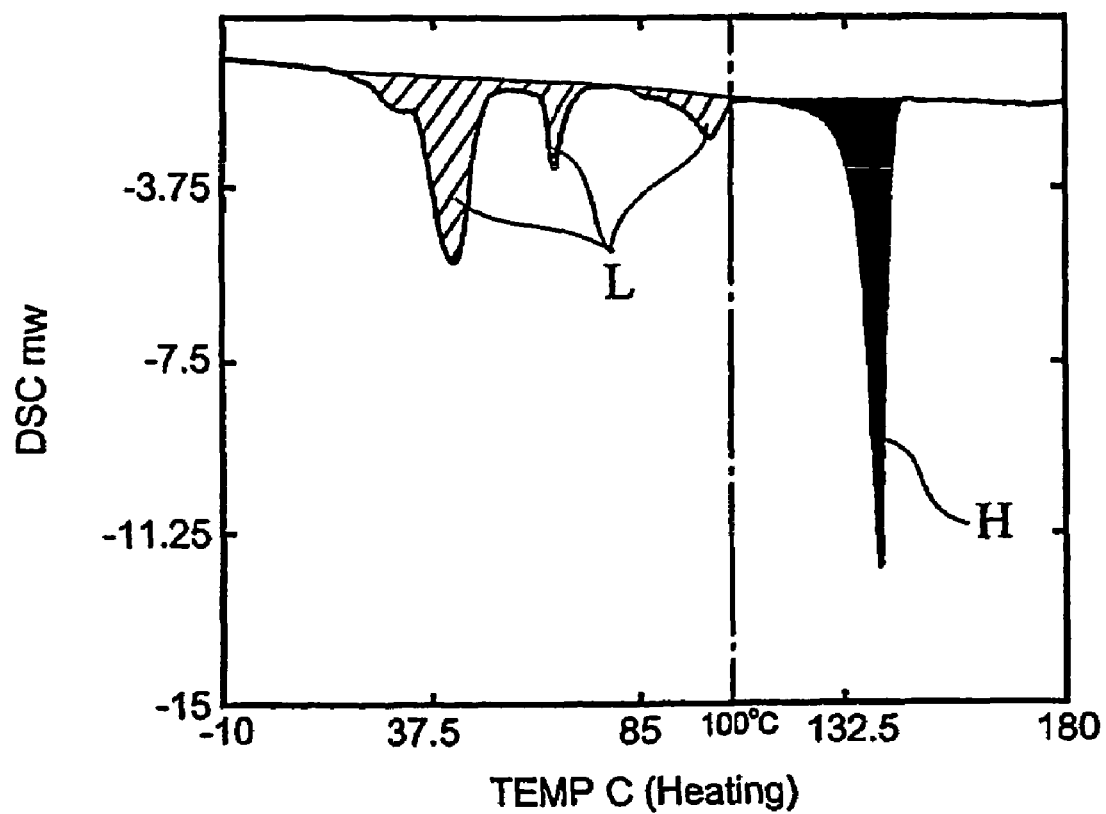
FIG. 4 is a DSC curve of an example of the wax composition according to the present invention.

The DSC curve of the wax composition is shown in FIG. 4. H indicates the high melting wax component, and L the low melting wax component. In calculating the ratio of the endothermic value, when a peak bridges over the line at 100° C., that peak is divided along the line into an area that is included under the high melting wax component and the other area that is included under the low melting wax component.

EXAMPLES 3-2 TO 3-4 AND COMPARATIVE EXAMPLES 3-1 TO 3-2

Wax compositions were prepared in the same manner as in Example 3-1, except for using the mixed wax indicated in Table 3-1.

The ratio of the endothermic value ΔH in the region higher than 100° C. to the endothermic value ΔH in the region lower than 100° C., the MFR at 125° C. and 1.2 kgf, and the MFR at 150° C. and 1.2 kgf of each of the resulting wax compositions are shown in Table 3-2.

EXAMPLE 3-5

A three-layered film having a moistureproof layer laminated on its both sides with a biodegradable resin layer was produced by pressing using the wax composition obtained in Example 3-1 and a biodegradable resin. In the resulting moistureproof film, the moistureproof layer was made of the wax composition, and each biodegradable resin layer was made of the biodegradable resin. The biodegradable resin was a polyblend of polycaprolactone and polyethylene succinate. The resulting film was biaxially stretched to obtain a moistureproof film. The moistureproof film had a total thickness of 100 μm in which the thicknesses of the moistureproof layer and each biodegradable layer were 50 μm and 25 μm, respectively. The moisture permeability of the film per se was 13 g/m²·24 hr as measured by the dish method (JIS Z0208, condition B). The moisture permeability of the wax composition was found to be 0.7 g·mm/m²·24 hr as calculated from the measured moisture permeability of the three-layered film and the moisture permeability of a 25 μM thick film of the biodegradable resin (PHB05) (=530 g/m²·24 hr).

EXAMPLE 3-6

A moistureproof film was prepared in the same manner as in Example 3-5, except for replacing the wax composition of Example 3-1 with the one obtained in Example 3-2. The moisture permeability of the resulting film per se was 31 g/m²·24 hr as measured in the same manner as in Example 3-5. The moisture permeability of the wax composition was calculated to be 1.8 g·mm/m²·24 hr in the same manner as described.

TABLE 3-1

| | Low-melting Wax | | | High-melting Wax | | | Polymer |
|---|---|---|---|---|---|---|---|
| | Hi-Mic-1045 (wt %) | Hi-Mic-1070 (wt %) | Endothermic Peak (° C.) | EB-FF (wt %) | EB-WAX (C8) (wt %) | Endothermic Peak (° C.) | Polyisoprene (wt %) |
| Example 3-1 | 40 | — | 42 | 40 | — | 140 | 20 |
| Example 3-2 | — | 64 | 45 | 16 | — | 138 | 20 |
| Example 3-3 | 40 | — | 42 | — | 40 | 166 | 20 |
| Example 3-4 | — | 64 | 44 | — | 16 | 168 | 20 |
| Compara. Example 3-1 | — | 80 | 44 | — | — | — | 20 |
| Compara. Example 3-2 | 40 | — | 43 | 40 | — | — | 0 |

TABLE 3-2

| | | MFR | |
|---|---|---|---|
| | Ratio of Endothermic Value | 125° C. (g/10 min) | 150° C. (g/10 min) |
| Example 3-1 | 1.11 | 1 | >1000 |
| Example 3-2 | 0.33 | 101 | >1000 |
| Example 3-3 | 0.77 | 4 | 49 |
| Example 3-4 | 0.33 | 207 | 303 |
| Comparative Example 3-1 | 0 | 790 | >1000 |
| Comparative Example 3-2 | 0.3 | Unmeasurable | Unmeasurable |

It is apparently seen from Table 3-2 that the MFR of the wax compositions of Examples 3-1 to 3-4 falls within a range suited for melt molding. It is seen from Examples 3-5 and 3-6 that the moistureproof films of Examples 3-5 and 3-6 exhibit low moisture permeability.

INDUSTRIAL APPLICABILITY

The wax composition according to the present invention is preferably used particularly as a moistureproofing or adhesive composition containing a wax as a main component. The wax composition can be produced without an organic solvent or a like aid so that it is applicable with extremely high safety to a variety of fields including packaging materials for food and the like.

The wax composition according to the present invention is excellent in moistureproofness and easy to melt mold. The wax composition according to the present invention exhibits superior moistureproofness and good adhesion. By using these wax compositions, biodegradable films, laminates and containers excellent in moistureproofness are provided.

The wax composition according to the present invention is excellent in moistureproofness and easy to process by melt molding and the like. A moistureproof film obtained by using the wax composition is superior in hot water resistance and thermoformability. The process of producing a moistureproof article according to the present invention makes it possible to heat process a wax composition while the wax composition maintains a sufficient viscosity thereby to efficiently provide a moistureproof article excellent in moistureproofness and heat stability. The wax composition of the present invention is suitably applied to a moistureproof layer of a moistureproof film and a moistureproof article having the moistureproof layer.

The invention claimed is:

1. A process of producing a wax composition consisting of a microcrystalline wax and a component to be mixed with the wax, comprising mixing the wax and the component to be mixed with the wax by applying an external force at a temperature lower than the melting completion temperature of the wax, wherein the wax composition comprises 15% to 30% of the component to be mixed with the wax, the component to be mixed with the wax is natural rubber or polyisoprene rubber, and the wax composition obtained comprises no more than 3 ppm of solvent.

2. The process of producing a wax composition according to claim 1, wherein the mixing of the wax and the component to be mixed with the wax at a temperature lower than the melting completion temperature of the wax is followed by heating the mixture at or above the melting completion temperature of the wax.

3. The process of producing a wax composition according to claim 1, wherein the component to be mixed with the wax is natural rubber.

4. The process of producing a wax composition according to claim 1, wherein the component to be mixed with the wax is polyisoprene rubber.

* * * * *